(No Model.)
H. A. BRAUN.
PRESSURE DEVICE FOR BEER, &c.
No. 576,087.  Patented Feb. 2, 1897.
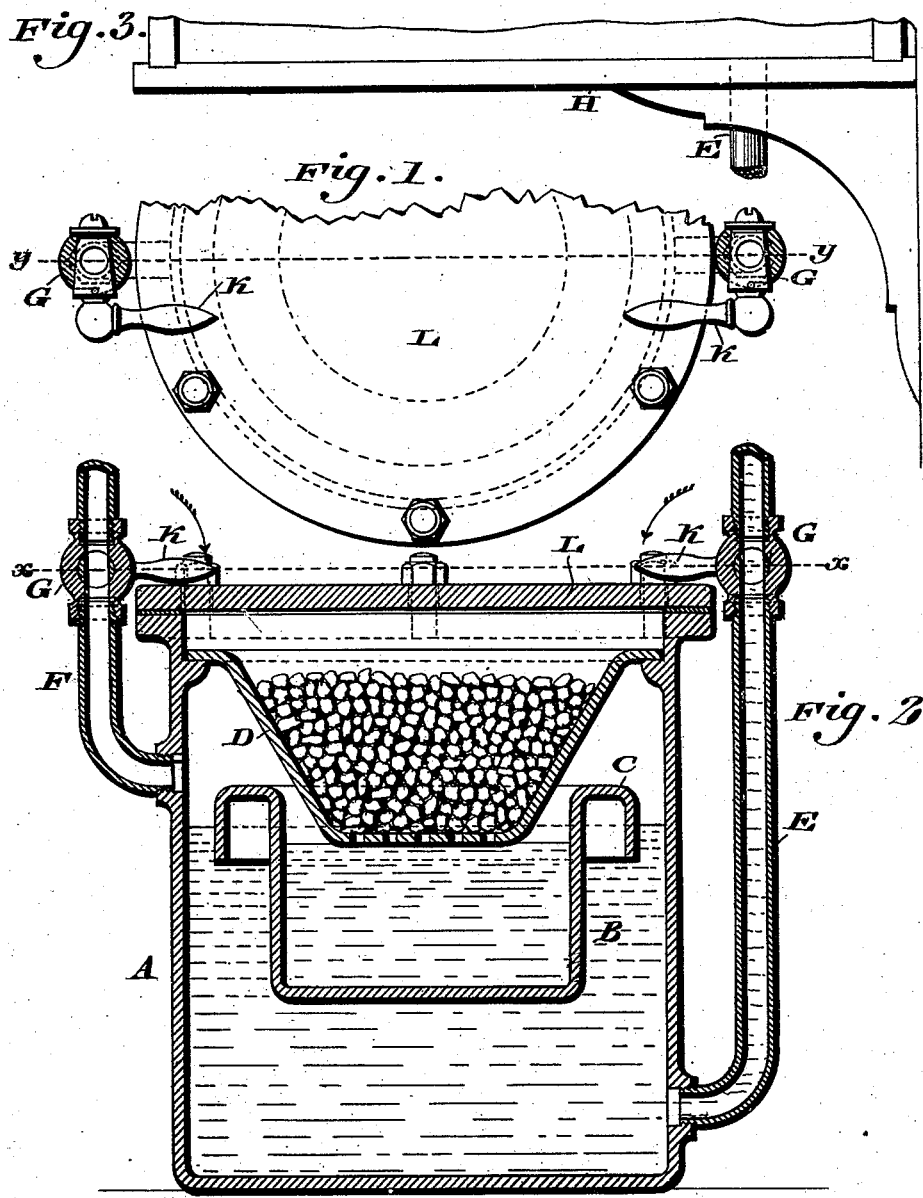

UNITED STATES PATENT OFFICE.

HENRY A. BRAUN, OF PHILADELPHIA, PENNSYLVANIA, ASSIGNOR OF TWO-THIRDS TO JOHN R. McFETRIDGE, JR., AND EDWIN L. BRAUN, OF SAME PLACE.

PRESSURE DEVICE FOR BEER, &c.

SPECIFICATION forming part of Letters Patent No. 576,087, dated February 2, 1897.

Application filed December 21, 1895. Serial No. 572,867. (No model.)

*To all whom it may concern:*

Be it known that I, HENRY A. BRAUN, a citizen of the United States, residing in the city and county of Philadelphia, State of Pennsylvania, have invented a new and useful Improvement in Pressure Devices for Beer, Ale, and other Fluids, which improvement is fully set forth in the following specification and accompanying drawings.

My invention consists of a pressure device for beer, ale, and other fluids, the same embodying a tank which contains a chamber and float and is in communication with a supply of liquid and with a barrel, keg, &c., in which pressure is to be exerted, said float containing a fluid in which the chemical or material of the chamber is adapted to dip, thus automatically generating gas in the tank, as required, to increase the supply in the barrel, &c., as the fluid in the latter is withdrawn, there being also an automatical cessation of the generation of the gas when the withdrawal of the fluid ceases.

Figure 1 represents a partial top view and partial horizontal section on line $x\,x$, Fig. 2, of a portion of a pressure device embodying my invention. Fig. 2 represents a vertical section thereof on line $y\,y$, Fig. 1. Fig. 3 represents a side elevation of a portion of the device. Fig. 4 represents a side elevation of the device on a reduced scale.

Similar letters of reference indicate corresponding parts in the several figures.

Referring to the drawings, A designates a closed tank, within which is a vessel B, the same having a circumferential hollow rim or gutter C, forming an air-chamber at the top of the vessel, whereby said vessel is caused to float on the water placed in said tank.

Suspended from the upper part of the tank A is a chamber D, whose bottom or lower portion is perforated and adapted to dip into fluid in the vessel B, as will be hereinafter-ward described.

The tank A is provided with a water-supply pipe E and a gas-discharge pipe F, each pipe having a valve or regulating or controlling cock G. The pipe F is connected with a barrel or keg J, which contains beer, ale, and other fluid, and the pipe E is connected with a tank H, containing water for supplying the tank A.

The vessel D is adapted to contain a chemical or material, such as marble, which, with the fluid in the float B, such as hydrochloric acid, forms a gas of the order of carbon dioxid.

The operation is as follows: As the gas is generated, the pipe F being in connection with the barrel, which latter is closed, the pressure of the gas is exerted on the water in the tank A, thus lowering the same and causing it to rise in the pipe E, and thereby return into the tank H until the level of the acid is below the lower level of the marble, when the generation of the gas ceases. When a quantity of beer or fluid is withdrawn from the barrel J, the vacated space in the latter is immediately occupied by a quantity of gas leaving the tank A. Owing to the displaced gas in said tank the pressure of the water in the pipe or column E causes the water in the tank A to rise, whereby the float B also rises, and the acid and marble are again in contact, when there is a further generation of gas, the pressure of which is exerted on the water in the tank A, as before. Thus these operations continue while the fluid is being withdrawn and when the withdrawal ceases. The handles K of the cocks G are so disposed that they overhang the lid L of the tank A when the cocks are opened. Consequently when said lid is to be removed for charging the device or other purposes it is necessary to raise the lid and turn the handles upwardly, whereby the cocks G are closed and the supply of water is cut off and the back pressure of gas from the barrel prevented, said cocks being provided with shoulders and pins, whereby they can be opened only in the direction of the arrows, Fig. 2, it being understood that the cocks are open when the device is in operation.

Having thus described my invention, what I claim as new, and desire to secure by Letters Patent, is—

1. In a pressure device for the purpose set forth, a tank provided with a vessel, adapted to float in said tank, and a chamber supported in said tank and adapted to have said floating vessel rise above and recede from the bottom of said chamber, said chamber being perforated, and the parts combined substantially as described.

2. A pressure device for the purpose set forth, consisting of a closed tank provided with water-inlet and gas-outlet pipes, a vessel in said tank adapted to float, and a perforated stationary chamber supported in said tank, said stationary chamber being adapted to have said floating vessel rise above and recede from the bottom of the same, said parts being combined substantially as described.

3. A closed tank containing a stationary perforated chamber, adapted to contain suitable gas-generating material, a floating vessel in said tank, below said chamber and adapted to contain gas-generating material, a liquid-supply column connected with the lower part of said tank, and a gas-discharge pipe connected with the upper part of the said tank, said parts being combined, substantially as described.

4. In a pressure device, a closed tank, provided with liquid-supply and gas-discharging pipes, and cocks in said pipes, said cocks having their handles located adjacent to the lid of said tank so as to be operated to close the cocks by the removal of the said lid, substantially as described.

5. A pressure device for the purpose stated, having a closed tank, a stationary perforated chamber and a floating vessel, the latter being provided with an air-chamber rim, and being adapted to move to and from the bottom of said stationary chamber, said parts being combined, substantially as described.

6. In a pressure device, a closed tank, a water-supply tank with a pipe leading to said closed tank, a gas-outlet pipe leading from said closed tank, a floating vessel in said closed tank, a perforated tank supported in said closed tank above said floating vessel, and valves in said inlet and outlet pipes, said parts being combined substantially as described.

HENRY A. BRAUN.

Witnesses:
JOHN A. WIEDERSHEIM,
WM. C. WIEDERSHEIM.